United States Patent
Alsters

(10) Patent No.: US 6,677,466 B1
(45) Date of Patent: Jan. 13, 2004

(54) METHOD FOR STABILIZING HYDROGEN PEROXIDE

(75) Inventor: Paulus Lambertus Alsters, Maastricht (NL)

(73) Assignee: DSM Fine Chemicals Austria NFG GmbH & Co KG, Linz (AT)

( * ) Notice: Subject to any disclaimer, the term of this patent is extended or adjusted under 35 U.S.C. 154(b) by 253 days.

(21) Appl. No.: 09/979,029

(22) PCT Filed: Jun. 3, 2000

(86) PCT No.: PCT/EP00/05078

§ 371 (c)(1),
(2), (4) Date: Nov. 15, 2001

(87) PCT Pub. No.: WO01/02293

PCT Pub. Date: Jan. 11, 2001

(30) Foreign Application Priority Data

Jun. 29, 1999 (AT) ................................. 1128/99

(51) Int. Cl.⁷ ............................ C01B 15/02; D06L 3/02
(52) U.S. Cl. ............... 549/531; 252/407; 423/272; 435/41; 435/132; 568/559; 568/568; 8/111
(58) Field of Search .......................... 549/531; 568/559, 568/568; 435/41; 423/584, 272; 252/380–407

(56) References Cited

U.S. PATENT DOCUMENTS

| | | | | |
|---|---|---|---|---|
| 3,781,409 A | * | 12/1973 | Munday .................... 423/273 |
| 3,789,114 A | * | 1/1974 | Giesselmann et al. ...... 423/588 |
| 4,035,471 A | * | 7/1977 | Strong ........................ 423/272 |
| 4,369,128 A | * | 1/1983 | Moseley et al. ............ 502/169 |
| 4,900,468 A | * | 2/1990 | Mitchell et al. ............... 8/648 |
| 5,078,672 A | | 1/1992 | Dougherty et al. |
| 5,180,514 A | * | 1/1993 | Farr et al. .............. 252/186.29 |
| 5,942,202 A | * | 8/1999 | Nishimura et al. ......... 423/273 |

FOREIGN PATENT DOCUMENTS

| | | |
|---|---|---|
| DE | 12 62 982 | 3/1968 |
| EP | 0 384 911 | 8/1990 |
| GB | 1 449 525 | 9/1976 |
| WO | 95/00439 | 1/1995 |

* cited by examiner

Primary Examiner—Wayne A. Langel
Assistant Examiner—William G. Wright, Sr.
(74) Attorney, Agent, or Firm—Wenderoth, Lind & Ponack, L.L.P.

(57) ABSTRACT

The invention relates to the use of one or more α-keto carboxylic acid esters and/or aldehyde carboxylic acid esters for stabilizing hydrogen peroxide during enzyme-catalyzed or metal-catalyzed oxidation reactions in organic synthesis, as well as for stabilizing hydrogen peroxide or aqueous or organic hydrogen peroxide solutions during production, storage and transport.

10 Claims, No Drawings

METHOD FOR STABILIZING HYDROGEN PEROXIDE

Hydrogen peroxide has been used for a relatively long time as an oxidizing agent in organic synthesis reactions, and also as a bleach, for example for the bleaching of paper or textiles. The disadvantage of hydrogen peroxide is the tendency toward decomposition into water and oxygen, where, in particular, traces of metals or metal salts increase the rate of the decomposition reaction catalytically. This problem arises with oxidation reactions which use a metal catalyst, in particular a transition metal catalyst, or an enzyme with catalase activity. This means that enzyme- or metal-catalyzed oxidation reactions of this type have hitherto required a large excess of hydrogen peroxide, resulting, in turn, in negative effects with regard to process economics and yield. In addition, the possibility of a "scale-up" of such reactions is severely limited, which is associated with undesired, extremely exothermic hydrogen peroxide decomposition with the formation of large amounts of oxygen. In addition, the decomposition of the hydrogen peroxide during the preparation, storage or transportation of hydrogen peroxide or of aqueous solutions thereof, or in other application fields for hydrogen peroxide, such as, for example, in the bleaching of paper and textiles, likewise presents problems.

For these reasons, a very wide variety of additives for stabilizing hydrogen peroxide and aqueous hydrogen peroxide solutions has already been investigated. These are, for example, inorganic salts, such as phosphates, pyrophosphates or stannates, organic compounds, such as organic chelating agents or organic acids. These additives are described inter alia in "Hydrogen Peroxid" [sic], Schumb et al., published by Reinhold Publishing Company, New York (1955), pages 447 to 539. These additives are in most cases unsuitable for enzyme- or metal-catalyzed oxidation reactions using hydrogen peroxide since they lead to poisoning of the catalyst used.

For example, it is known, from D. de Vos, T. Bein, Chem. Comm. 1996, 917 or D. de Vos, T. Bein, J. Organomettal. Chem. 1996, 520, 195, that acetone as solvent suppresses the hydrogen peroxide decomposition during catalytic oxidation reactions. However, if acetone is used, there is a danger that highly explosive products, such as 3,3,6,6-tetramethyltetroxane, which can precipitate out in the form of explosive crystals during the oxidation or the work-up, form. For this reason, the combination of acetone or another ketone as solvent and hydrogen peroxide is unsuitable for processes on an industrial scale.

Accordingly, it was an object of the present invention to find new additives which ensure the stabilization of hydrogen peroxide primarily in enzyme- or metal-catalyzed reactions to a high degree and which are suitable for industrial scale.

Unexpectedly, this object was achieved by using α-ketocarboxylic esters or aldehydecarboxylic esters. It was also expected that such α-keto- or aldehyde-carboxylic esters only have to be added in small amounts, while, in contrast thereto, acetone or other ketones have to be used as solvents in order to effectively suppress the $H_2O_2$ decomposition.

The invention therefore provides for the use of one or more α-keto- and/or aldehydecarboxylic esters for stabilizing hydrogen peroxide in enzyme- or metal-catalyzed oxidation reactions in organic synthesis.

According to the invention, hydrogen peroxide in enzyme- or metal-catalyzed oxidation reactions is stabilized by adding a sufficient amount of α-keto- and/or aldehydecarboxylic esters, and suppresses the decomposition of hydrogen peroxide into water and oxygen. Furthermore, this is likewise of importance, for example, in the preparation, storage or transportation of hydrogen peroxide or of hydrogen peroxide solutions, where even small amounts of metal impurities can lead to decomposition.

The invention further provides, accordingly, for the use of one or more α-keto- and/or aldehydecarboxylic esters for stabilizing hydrogen peroxide or hydrogen peroxide solutions in the preparation, storage or transportation.

Hydrogen peroxide or solutions thereof stabilized in this way are suitable not only for enzyme- or metal-catalyzed oxidation reactions in organic synthesis, they can, for example, also be used for the bleaching of paper and textiles, such as, for example, linen, cotton, wool, silk or jute.

Suitable α-keto- or aldehydecarboxylic esters are all α-keto- or aldehydecarboxylic esters with the structural element of the formula I

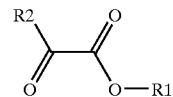

Here, $R_1$ and $R_2$ in the case of α-ketocarboxylic esters are a saturated or unsaturated, branched, unbranched or cyclic $C_1$–$C_{30}$-alkyl radical or an aromatic or heteroaromatic radical, where these radicals may be unsubstituted or substituted by $C_1$–$C_{30}$-alkoxy, amino, amide, cyano, carbonyl, halogen, hydroxyl or nitrile groups.

In the case of the aldehydecarboxylic esters, $R_2$ is hydrogen. $R_1$ has the same meaning as defined above.

Preferably, in the case of α-ketocarboxylic esters, $R_1$ and $R_2$ are a $C_1$–$C_5$-alkyl radical, such as methyl, ethyl, propyl, isopropyl, tert-butyl or a benzyl radical. The methyl radical is particularly preferred. In the case of aldehydecarboxylic esters, R1 is likewise preferably a $C_1$–$C_5$-alkyl radical, such as methyl, ethyl, propyl, isopropyl, tert-butyl or a benzyl, radical, and particularly preferably a methyl radical. $R_2$ in this case is hydrogen.

Thus, according to the invention, particularly preferred stabilizers are methyl glyoxylate or methyl pyruvate.

The α-carbonyl esters can also be used as stabilizers in the form of a corresponding hemiacetal or full acetal.

Suitable glyoxylic ester hemiacetals are described, for example, in EP-P-0 099 981. Preference is giving to using glyoxylic methyl ester methyl hemiacetal (GMHA), glyoxylic ethyl ester hemiacetals, glyoxylic propyl ester hemiacetals, glyoxylic isopropyl ester hemiacetals, glyoxylic t- or n-butyl ester hemiacetals. Particular preference is given to using GMHA as hemiacetal.

Suitable full acetals are dialkyl acetals, such as dimethyl acetal.

For the stabilization it is possible here to use only one α-keto- or aldehydecarboxylic ester, and also mixtures of two or more α-ketocarboxylic esters, two or more aldehyde carboxylic esters or mixtures of α-keto- and aldehydecarboxylic esters.

The stabilizer according to the invention or a stabilizer mixture is used here in an equivalent amount, in an excess or in a substoichiometric amount relative to the hydrogen peroxide. Preference is given to adding 0.05 to 1.5 mol, particularly preferably 0.2 to 1.2 mol, of stabilizer or stabilizer mixture per mole of hydrogen peroxide. The stabilizer can, for example, be used in a substoichiometric amount if hydrogen peroxide is added slowly during the catalytic oxidation reaction. If this is not the case, then the addition of an equimolar amount of stabilizer is very particularly preferred.

The stabilizers listed above are suitable for stabilizing hydrogen peroxide in enzyme- or metal-catalyzed oxidation reactions. In oxidation reactions, the reaction solutions comprise at least the substrate to be oxidized, an organic solvent or solvent mixture suitable for the oxidation reaction in question, and a metal catalyst, preferably a transition metal catalyst, or an enzyme catalyst.

The reaction solution may optionally comprise a buffer solution.

The stabilizers according to the invention are, accordingly, used in catalyzed oxidation reactions, irrespective of the nature of the catalyst used and of the solvent used.

Catalysts which may be present are, accordingly, for example all customary oxidation catalysts, such as, for example, $RuO_2$, $[Mn_2O_3\{Me_3tacn\}_2](PF_6)_2$, ($Me_3tacn=1,4,7$-trimethyl-1,4,7-triacyclononane), $V_2O_5$, manganese(II) acetate, chromium(III) nitrate etc., or enzymes, such as vanadium haloperoxidase etc.

Solvents may, for example, be alcohols, such as methanol, ethanol, t-butanol, etc., ethyl acetate, acetic acid, acetone, acetonitrile, methylene chloride, chlorobenzene etc. and water.

This is of great importance particularly for those oxidation reactions in which hitherto a large excess of hydrogen peroxide has had to be used, which has a negative effect on the economic suitability and safety of the process, the reaction volume and on the possibility of "scale up", based on the undesired, extremely exothermic decomposition of hydrogen peroxide in combination with the formation of large amounts of oxygen.

Preference is given to using the stabilizers according to the invention in epoxidations, alcohol oxidations, oxidations of C—H bonds, oxidative halogenations etc.

In addition, the stabilizers according to the invention can also be used for stabilizing hydrogen peroxide during its preparation, storage or transportation, or in the case of its use as bleach for paper and textiles.

Hydrogen peroxide can also be in the form of an aqueous or an organic solution.

EXAMPLE 1

A 50% strength aqueous solution of $H_2O_2$ (304 mg; 4.46 mmol) was added to 454 mg (4.46 mmol) of methyl pyruvate and to 535 mg (4.46 mmol) of glyoxylic methyl ester methyl hemiacetal, respectively. In the case of methyl pyruvate, a marked evolution of heat was discovered during the addition. After one hour, the $H_2O_2/\alpha$-keto ester mixture was mixed with 1 ml of solvent and added to a suspension of 2.5 mg of $RuO_2.xH_2O$ catalyst (Aldrich) in 4 ml of solvent. The suspension was introduced into a 50 ml flask which was maintained at room temperature in a water bath.

As a comparison, a suspension of 2.5 mg of $RuO_2.xH_2O$ catalyst (Aldrich) in 4 ml of solvent was combined with a 50% strength aqueous solution of $H_2O_2$ (304 mg; 4.46 mmol) and 1 ml of solvent without stabilizer.

The amount of oxygen which dissolved during the decomposition of the hydrogen peroxide was determined as a function of time using a Brooks meter, which permitted measurement of the gas flow and of the total amount of evolved gas.

The stabilizers and solvents (solv.) used and the results are given in Tables 1–3.

The amount of oxygen is defined here as % of the maximum amount to be calculated on the basis of stoichiometry.

TABLE 1

Comparative experiment without stabilizer

O2 evolution/as a function of the solv. used
V(O2) (Vmax(O2)*100%

| t/min | Ethyl acetate | Acetic acid | t-Butanol | Methanol | Acetone | Acetonitrile | Water |
|---|---|---|---|---|---|---|---|
| 1 | 27 | 0 | 11 | 10 | 28 | 28 | 27 |
| 2 | 48 | 12 | 25 | 20 | 47 | 51 | 46 |
| 3 | 52 | 28 | 38 | 27 | 49 | 60 | 49 |
| 4 | 54 | 38 | 47 | 31 | 50 | 62 | 49 |
| 5 | 54 | 47 | 70 | 35 | 51 | 63 | 49 |
| 10 | 54 | 70 | 70 | 51 | 51 | 63 | 49 |
| 15 | 54 | 79 | 70 | 62 | 51 | 63 | 49 |
| 20 | 54 | 82 | 70 | 69 | 51 | 63 | 49 |
| 25 | 54 | 82 | 70 | 72 | 51 | 63 | 49 |
| 30 | 54 | 82 | 70 | 73 | 51 | 63 | 49 |
| 35 | 54 | 82 | 70 | 73 | 51 | 63 | 49 |
| 40 | 54 | 82 | 70 | 73 | 51 | 63 | 49 |

TABLE 2 with methyl pyruvate as stabilizer

O2 evolution/as a function of the solv. used
V(O2) (Vmax(O2)*100%

| t/min | Ethyl acetate | Acetic acid | t-Butanol | Methanol | Acetone | Acetonitrile | Water |
|---|---|---|---|---|---|---|---|
| 1 | 8 | 0 | 2 | 10 | 10 | 9 | 9 |
| 2 | 12 | 0 | 5 | 19 | 20 | 18 | 17 |
| 5 | 20 | 2 | 10 | 32 | 29 | 30 | 30 |
| 10 | 29 | 4 | 18 | 43 | 29 | 40 | 40 |
| 15 | 32 | 4 | 21 | 49 | 29 | 47 | 48 |
| 20 | 37 | 4 | 23 | 52 | 29 | 51 | 51 |
| 25 | 40 | 4 | 25 | 53 | 29 | 53 | 55 |
| 30 | 42 | 4 | 25 | 53 | 29 | 53 | 55 |
| 35 | 47 | 4 | 25 | 53 | 29 | 53 | 55 |
| 40 | 50 | 4 | 25 | 53 | 29 | 53 | 55 |

TABLE 3 with glyoxylic methyl ester methyl hemiacetal (GMHA) as stabilizer

O2 evolution/as a function of the solv. used
V(O2) (Vmax(O2)*100%

| t/min | Ethyl acetate | Acetic acid | t-Butanol | Methanol | Acetone | Acetonitrile | Water |
|---|---|---|---|---|---|---|---|
| 1 | 3 | 0 | 0 | 0 | 0 | 3 | 3 |
| 2 | 5 | 1 | 0 | 0 | 0 | 3 | 4 |
| 3 | 6 | 2 | 0 | 0 | 0 | 3 | 5 |
| 4 | 7 | 2 | 0 | 0 | 0 | 3 | 6 |
| 5 | 8 | 2 | 0 | 0 | 0 | 3 | 10 |
| 10 | 9 | 2 | 0 | 0 | 0 | 3 | 13 |
| 15 | 9 | 2 | 0 | 0 | 0 | 3 | 13 |
| 20 | 9 | 2 | 0 | 0 | 0 | 3 | 13 |
| 25 | 9 | 2 | 0 | 0 | 0 | 3 | 13 |
| 30 | 9 | 2 | 0 | 0 | 0 | 3 | 13 |
| 35 | 9 | 2 | 0 | 0 | 0 | 3 | 13 |
| 40 | 9 | 2 | 0 | 0 | 0 | 3 | 13 |

EXAMPLE 2

A 50% strength aqueous solution of $H_2O_2$ (304 mg; 4.46 mmol) was added to 454 mg (4.46 mmol) of methyl pyruvate and to 535 mg (4.46 mmol) of glyoxylic methyl ester methyl hemiacetal, respectively. In the case of methyl pyruvate, a marked evolution of heat was discovered during the addition. After one hour, the $H_2O_2$/α-keto ester mixture was mixed with 1 ml of solvent and added to a suspension of 1.0 mg of $[Mn_2O_3\{Me_3tacn\}_2](PF6)_2$ catalyst in 4 ml of solvent. The suspension was introduced into a 50 ml flask which was maintained at room temperature in a water bath. As a result of this addition, in cases where undissolved catalyst was still present, the catalyst dissolved completely.

As a comparison, a suspension of 1.0 mg of $[Mn_2O_3\{Me_3tacn\}_2](PF_6)_2$ catalyst in 4 ml of solvent was combined with a 50% strength aqueous solution of $H_2O_2$ (304 mg; 4.46 mmol) and 1 ml of solvent without stabilizer.

The amount of oxygen which was evolved from the decomposition of the hydrogen peroxide was determined as a function of time using a Brooks meter, which permitted measurement of the gas flow and the total amount of evolved gas.

The stabilizers and solvents (solv.) used and the results are given in Tables 4–6.

TABLE 4

Comparative experiment without stabilizer

O2 evolution/as a function of the solv. used
V(O2) (Vmax(O2)*100%

| t/min | Ethyl acetate | Acetic acid | t-Butanol | Methanol | Acetone | Acetonitrile |
|---|---|---|---|---|---|---|
| 1 | 2 | 0 | 0 | 1 | 1 | 28 |
| 2 | 9 | 2 | 0 | 1 | 2 | 51 |
| 3 | 19 | 6 | 0 | 1 | 3 | 60 |
| 4 | 29 | 9 | 0 | 1 | 4 | 62 |
| 5 | 37 | 12 | 0 | 3 | 5 | 63 |
| 10 | 48 | 33 | 0 | 18 | 12 | 63 |
| 15 | 48 | 49 | 31 | 30 | 28 | 63 |
| 20 | 48 | 55 | 65 | 39 | 40 | 63 |
| 25 | 48 | 59 | 71 | 45 | 50 | 63 |
| 30 | 48 | 59 | 72 | 50 | 57 | 63 |
| 35 | 48 | 59 | 72 | 53 | 60 | 63 |
| 40 | 48 | 59 | 72 | 58 | 65 | 63 |
| 50 | 48 | 59 | 72 | 58 | 65 | 63 |
| 60 | 48 | 59 | 72 | 58 | 65 | 63 |
| 70 | 48 | 59 | 72 | 58 | 65 | 63 |
| 80 | 48 | 59 | 72 | 58 | 65 | 63 |

TABLE 5 with methyl pyruvate as stabilizer
O2 evolution/as a function of the solv. used
V(O2) (Vmax(O2)*100%

| t/min | Ethyl acetate | Acetic acid | t-Butanol | Methanol | Acetone | Acetonitrile |
|---|---|---|---|---|---|---|
| 1 | 0 | 0 | 0 | 1 | 0 | 0 |
| 4 | 0 | 3 | 0 | 2 | 0 | 0 |
| 5 | 0 | 8 | 0 | 2 | 0 | 0 |
| 10 | 6 | 20 | 0 | 2 | 0 | 3 |
| 15 | 9 | 24 | 0 | 2 | 0 | 9 |
| 20 | 9 | 24 | 0 | 2 | 0 | 18 |
| 25 | 9 | 24 | 0 | 2 | 0 | 25 |
| 30 | 9 | 24 | 0 | 2 | 0 | 30 |
| 35 | 9 | 24 | 0 | 2 | 0 | 35 |
| 50 | 9 | 24 | 0 | 2 | 6 | 38 |
| 60 | 9 | 24 | 0 | 2 | 12 | 38 |
| 70 | 9 | 24 | 0 | 2 | 20 | 38 |
| 80 | 9 | 24 | 0 | 2 | 28 | 38 |

TABLE 6 with glyoxylic methyl ester methyl hemiacetal
(GMHA) as stabilizer
O2 evolution/as a function of the solv. used
V(O2) (Vmax(O2)*100%

| t/min | Ethyl acetate | Acetic acid | t-Butanol | Methanol | Acetone | Acetonitrile |
|---|---|---|---|---|---|---|
| 5 | 0 | 0 | 0 | 1 | 0 | 0 |
| 10 | 4 | 2 | 0 | 1 | 0 | 0 |
| 15 | 8 | 3 | 0 | 1 | 0 | 0 |
| 20 | 9 | 3 | 0 | 1 | 0 | 0 |
| 25 | 9 | 3 | 0 | 1 | 0 | 0 |
| 30 | 9 | 3 | 0 | 1 | 0 | 0 |
| 35 | 9 | 3 | 0 | 1 | 0 | 0 |
| 40 | 9 | 3 | 0 | 1 | 0 | 0 |
| 50 | 9 | 3 | 0 | 1 | 0 | 0 |
| 60 | 9 | 3 | 0 | 1 | 9 | 0 |
| 70 | 9 | 3 | 0 | 1 | 12 | 0 |
| 80 | 9 | 3 | 0 | 1 | 12 | 0 |

EXAMPLE 3

$[Mn_2O_3\{Me_3tacn\}_2](PF_6)_2$-Catalyzed Epoxidation of Cyclohexene With $H_2O_2$ Variant a): Epoxidation Without α-Keto Ester and Without Oxalate Buffer (Comparison)

27.7 mg (0.035 mmol) of $[Mn_2O_3\{Me_3tacn\}_2](PF_6)_2$, 2.95 g (35.9 mmol) of cyclohexene and 5.14 g (35.0 mmol) of 1,3-dichlorobenzene were dissolved in 40 ml of acetonitrile. The resulting solution was cooled in an ice water bath and then 3.0 ml (52.5 mmol) of a 50% strength aqueous solution of $H_2O_2$ were added to the solution over the course of 3 hours. 15 minutes after the end of the $H_2O_2$ addition, the reaction mixture was analyzed by means of GC.

The result is given in Table 7.

Variant b): Epoxidation Without α-Keto Ester in the Presence of an Oxalate Buffer (Comparison)

The oxalate buffer was obtained by dissolving 13.5 g (0.15 mol) of oxalic acid and 6.15 g (0.15 mol) of NaOH in 1000 ml of water.

27.7 mg (0.035 mmol) of $[Mn_2O_3\{Me_3tacn\}_2](PF_6)_2$, 2.95 g (35.9 mmol) of cyclohexene and 5.14 g (35.0 mmol) of 1,3-dichlorobenzene were dissolved in 40 ml of acetonitrile. 1.4 ml of oxalate buffer (6 mol equivalent of oxalate based on the catalyst) were added to this solution. The resulting solution was cooled in an ice water bath and then 3.0 ml (52.5 mmol) of a 50% strength aqueous solution of $H_2O_2$ were then added to the solution over the course of 3 hours. 15 minutes after the end of the $H_2O_2$ addition, the reaction mixture was analyzed by means of GC.

The result is given in Table 7.

Variant c): Epoxidation in the Presence of an α-Keto Ester Without Oxalate Buffer 27.7 mg (0.035 mmol) of $[Mn_2O_3\{Me_3tacn\}_2](PF_6)_2$, 2.95 g (35.9 mmol) of cyclohexene, 1.79 g (17.5 mmol) of methyl pyruvate (MP) or 2.10 g (17.5 mmol) of GMHA and 5.14 g (35.0 mmol) of 1,3-dichlorobenzene were dissolved in 40 ml of acetonitrile. The resulting solution was cooled in an ice water bath and then 3.0 ml (52.5 mmol) of a 50% strength aqueous solution of $H_2O_2$ were added to the solution over the course of 3 hours. 15 minutes after the end of the $H_2O_2$ addition, the reaction mixture was analyzed by means of GC.

The result is given in Table 7.

Variant d): Epoxidation in the Presence of an α-Keto Ester and an Oxalate Buffer 27.7 mg (0.035 mmol) of [Mn$_2$O$_3$\{Me$_3$tacn\}$_2$](PF$_6$)$_2$, 2.95 g (35.9 mmol) of cyclohexene, 1.79 g (17.5 mmol) of methyl pyruvate (MP) or 2.10 g (17.5 mmol) of GMHA and 5.14 g (35.0 mmol) of 1,3-dichlorobenzene were dissolved in 40 ml of acetonitrile. 1.4 ml of oxalate buffer (6 mol equivalent of oxalate based on the catalyst) were added to this solution. The resulting solution was cooled in an ice water bath and then 3.0 ml (52.5 mmol) of a 50% strength aqueous solution of H$_2$O$_2$ were then added to the solution over the course of 3 hours. 15 minutes after the end of the H$_2$O$_2$ addition, the reaction mixture was analyzed by means of GC.

The result is given in Table 7.

In variants a)–d), 1,3-dichlorobenzene was present during the reaction as an internal standard. The reaction mixtures were each analyzed with GC (Hewlett Packard 5890 series II; CpSil5CB column (25 m×0.32 mm, dl=1.2 μm). Temperature program: start temp.: 70° C., init. time: 1 min., rate: 7° C./min, final temp.: 250° C.)

TABLE 7

| Variant: | a | b | c with MP | c with GMHA | d with MP | d with GMHA |
|---|---|---|---|---|---|---|
| Conversion | 0% | 64% | 31% | 94% | 100% | 100% |
| Yield | 0% | 39% | 14% | 60% | 68% | 76% |
| Selectivity | 0% | 61% | 45% | 64% | 68% | 76% |

EXAMPLE 4

27.7 mg (0.035 mmol) of [Mn$_2$O$_3$\{Me$_3$tacn\}$_2$](PF$_6$)$_2$, 2.95 g (35.9 mmol) of cyclohexene, 1.05 g (8.75 mmol) of GMHA and 5.14 g (35.0 mmol) of 1,3-dichlorobenzene were dissolved in 40 ml of acetonitrile. 1.4 ml of oxalate buffer (6 mol equivalent of oxalate based on the catalyst) were added to this solution. The resulting solution was cooled in an ice water bath and then 3.0 ml (52.5 mmol) of a 50% strength aqueous solution of H$_2$O$_2$ were added to the solution over the course of 6 hours. 15 minutes after the end of the H$_2$O$_2$ addition, the reaction mixture was analyzed by means of GC.

Conversion: 100%; yield: 81%; selectivity: 81%

EXAMPLE 5

27.7 mg (0.035 mmol) of [Mn$_2$O$_3$\{Me$_3$tacn\}$_2$](PF$_6$)$_2$, 3.74 g (35.9 mmol) of styrene, 1.05 g (8.75 mmol) of GMHA and 5.14 g (35.0 mmol) of 1,3-dichlorobenzene were dissolved in 40 ml of acetonitrile. 1.4 ml of oxalate buffer (6 mol equivalent of oxalate based on the catalyst) were added to this solution. The resulting solution was cooled in an ice water bath and then 3.0 ml (52.5 mmol) of a 50% strength aqueous solution of H$_2$O$_2$ were added to the solution over the course of 6 hours. 15 minutes after the end of the H$_2$O$_2$ addition, the reaction mixture was analyzed by means of GC.

Conversion: 88%; yield: 69%; selectivity: 78%

In Examples 4 and 5, 1,3-dichlorobenzene was present during the reaction as an internal standard. The reaction mixtures of Examples 4–6 were each analyzed with GC (Hewlett Packard 5890 series II; CpSil5CB column (25 m×0.32 mm, dl=1.2 μm). Temperature program: start temp.: 70° C., init. time: 1 min., rate: 7° C./min, final temp.: 250° C.).

EXAMPLE 6

18.4 mg (0.023 mmol) of [Mn$_2$O$_3$\{Me$_3$tacn\}$_2$](PF$_6$)$_2$, 2.52 g (23.3 mmol) of benzyl alcohol and 2.10 g (17.5 mmol) of GMHA were dissolved in 40 ml of t-butanol. The resulting solution was cooled to room temperature in an ice water bath, and then 4.0 ml (70.3 mmol) of a 50% strength aqueous solution of H$_2$O$_2$ were added to the solution over the course of 4 hours. GC analysis 15 minutes after the end of the H$_2$O$_2$ addition revealed a quantitative conversion of the benzyl alcohol.

The reaction mixture was diluted with 100 ml of diethyl ether, and the organic phase was extracted with 4×25 ml of water. 50 ml of an aqueous 0.5M NaOH solution were then added. Following the removal of the organic phase, the aqueous phase was extracted with 2×25 ml of diethyl ether. 100 ml of diethyl ether were then added, followed by 50 ml of aqueous 0.5M HCl solution. The organic phase was separated off and dried over sodium sulfate. Following removal of the solvent under reduced pressure, pure benzoic acid was isolated as a pale yellow solid.

Yield: 2.47 g (87%)

What is claimed is:

1. A method for stabilizing hydrogen peroxide in enzyme- or metal-catalyzed oxidation reactions in organic synthesis which comprises employing one or more α-keto- and/or aldehyde-carboxylic esters as a stabilizer for said hydrogen peroxide.

2. A method as claimed in claim 1 wherein the α-keto- or aldehydecarboxylic esters used are compounds of the formula I

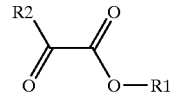

in which R$_1$ and R$_2$ in the case of α-ketocarboxylic esters are a saturated or unsaturated, branched, unbranched or cyclic C$_1$–C$_{30}$-alkyl radical or an aromatic or heteroaromatic radical, where these radicals may be unsubstituted or substituted by C$_1$–C$_{30}$-alkoxy, amino, amide, cyano, carbonyl, halogen, hydroxyl or nitrile groups, and in the case of the aldehydecarboxylic esters, R$_2$ is hydrogen and R$_1$ has the same meaning as for α-ketocarboxylic esters.

3. The method as claimed in claim 1 wherein the α-keto- or aldehydecarboxylic esters used are C$_1$–C$_5$-alkyl or benzyl glyoxylate or C$_1$–C$_5$-alkyl or benzyl pyruvate or hemiacetals or full acetals thereof.

4. A method for stabilizing hydrogen peroxide or aqueous or organic hydrogen peroxide solutions during preparation, storage or transportation, which comprises employing one or more α-keto- and/or aldehydecarboxylic esters as a stabilizer for said hydrogen peroxide.

5. The method as claimed in claim 4 wherein the α-keto- or aldehydecarboxylic esters used are compounds of the formula I

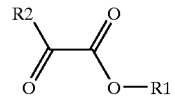

in which R$_1$ and R$_2$ in the case of α-ketocarboxylic esters are a saturated or unsaturated, branched, unbranched or cyclic C$_1$–C$_{30}$-alkyl radical or an aromatic or heteroaromatic radical, where these radicals may be unsubstituted or substituted by $C_1$–$C_{30}$-alkoxy, amino, amide, cyano, carbonyl, halogen, hydroxyl or nitrile groups, and in the case of the aldehydecarboxylic esters, $R_2$ is hydrogen and $R_1$ has the same meaning as for α-ketocarboxylic esters.

6. The method as claimed in claim 4 wherein the α-keto- or aldehydecarboxylic esters used are $C_1$–$C_5$-alkyl or benzyl glyoxylate or $C_1$–$C_5$-alkyl or benzyl pyruvate or hemiacetals or full acetals thereof.

7. A method for stabilizing hydrogen peroxide in enzyme- or metal-catalyzed oxidation reactions in organic synthesis, wherein α-keto- and/or aldehydecarboxylic esters are added to a reaction solution of an oxidation reaction, said solution comprising the substrate to be oxidized, an enzyme or metal catalyst and an organic solvent or solvent mixture.

8. The method as claimed in claim 7 wherein 0.05 to 1.5 mol of stabilizer are added per mole of hydrogen peroxide.

9. Stabilized hydrogen peroxide or stabilized, aqueous or organic hydrogen peroxide solutions, comprising one or more α-keto- and/or aldehydecarboxylic esters in an amount of from 0.05 to 1.5 mol per mole of hydrogen peroxide as stabilizer.

10. A method for bleaching paper and textiles which comprises employing stabilized hydrogen peroxide or stabilized, aqueous or organic hydrogen peroxide solutions containing one or more α-keto- and/or aldehydecarboxylic esters in an amount of from 0.05 to 1.5 mol per mole of hydrogen peroxide as a stabilizer for said hydrogen peroxide.

* * * * *